United States Patent
Drury et al.

(10) Patent No.: US 9,417,984 B1
(45) Date of Patent: Aug. 16, 2016

(54) PREEMPTIVELY GENERATING STATISTICAL FEEDBACK ON A DESIGN FILE AND PRESENTING THE FEEDBACK IN AN INPUT CONTEXT

(71) Applicant: Altera Corporation, San Jose, CA (US)

(72) Inventors: Adrian Drury, Sunnyvale, CA (US); Gregg William Baeckler, San Jose, CA (US)

(73) Assignee: Altera Corporation, San Jose, CA (US)

( * ) Notice: Subject to any disclaimer, the term of this patent is extended or adjusted under 35 U.S.C. 154(b) by 61 days.

(21) Appl. No.: 13/749,578

(22) Filed: Jan. 24, 2013

(51) Int. Cl.
G06F 17/50 (2006.01)
G06F 11/34 (2006.01)
G06F 9/44 (2006.01)
G06F 9/45 (2006.01)

(52) U.S. Cl.
CPC ........ *G06F 11/3457* (2013.01); *G06F 17/5031* (2013.01); *G06F 8/30* (2013.01); *G06F 8/41* (2013.01); *G06F 17/5009* (2013.01); *G06F 17/5022* (2013.01); *G06F 17/5045* (2013.01)

(58) Field of Classification Search
None
See application file for complete search history.

(56) References Cited

U.S. PATENT DOCUMENTS

| | | | | |
|---|---|---|---|---|
| 5,396,435 A | * | 3/1995 | Ginetti | 716/104 |
| 5,673,198 A | * | 9/1997 | Lawman et al. | 716/102 |
| 5,751,596 A | * | 5/1998 | Ginetti | G06F 17/5031 716/104 |
| 5,838,947 A | * | 11/1998 | Sarin | G06F 17/5022 703/14 |
| 6,466,898 B1 | * | 10/2002 | Chan | 703/17 |
| 7,496,906 B2 | * | 2/2009 | Black-Ziegelbein et al. | 717/145 |
| 7,870,515 B2 | * | 1/2011 | Shephard et al. | 716/132 |
| 8,713,554 B1 | * | 4/2014 | Chopra et al. | 717/168 |
| 8,762,120 B1 | * | 6/2014 | Zhao | G06F 8/30 703/13 |
| 8,972,958 B1 | * | 3/2015 | Brewer | G06F 8/41 717/135 |
| 2005/0223363 A1 | * | 10/2005 | Black-Ziegelbein et al. | 717/127 |
| 2005/0268269 A1 | * | 12/2005 | Coiley | G06F 17/5045 716/113 |
| 2007/0186204 A1 | * | 8/2007 | Fredrickson | G06F 17/5045 716/102 |
| 2008/0276209 A1 | * | 11/2008 | Albrecht | G06F 17/5031 716/113 |

(Continued)

OTHER PUBLICATIONS

Drechsler, R., et al., SyCE: an integrated environment for system design in SystemC, The 16th IEEE International Workshop on Rapid System Prototyping, 2005, Jun. 8-10, 2005, pp. 258-260, [retrieved on Mar. 25, 2016], Retrieved from the Internet: <URL:http://ieeexplore.ieee.org/>.*

(Continued)

*Primary Examiner* — Thuy Dao
*Assistant Examiner* — Geoffrey St Leger
(74) *Attorney, Agent, or Firm* — Fletcher Yoder, P.C.

(57) ABSTRACT

Techniques are provided for assisting programmers of electronics components and systems, as well as software components and systems, assess the effectiveness of their designs. Various embodiments provide improved processes for providing statistical feedback to programmers concerning performance features of a system or component they are designing. The techniques provide for faster generation and more effective communication of feedback to the programmer. Such techniques include automatically launching a process for generating such feedback either at periodic intervals or in response to a predefined event. Additionally, techniques are provided for providing the feedback to the programmer in a same working environment in which the programmer is editing the program file, and for displaying the feedback in a format that is more useful to the programmer.

21 Claims, 6 Drawing Sheets

(56) References Cited

U.S. PATENT DOCUMENTS

| | | | | |
|---|---|---|---|---|
| 2011/0295587 | A1* | 12/2011 | Eeckhout | G06F 11/3457 703/21 |
| 2012/0060133 | A1* | 3/2012 | Krishnan | G06F 17/5031 716/108 |
| 2012/0167055 | A1* | 6/2012 | Yokoi | 717/126 |
| 2013/0125044 | A1* | 5/2013 | Saylor et al. | 715/785 |
| 2013/0311957 | A1* | 11/2013 | Chang | G06F 17/5009 716/50 |

OTHER PUBLICATIONS

Rogin, F., et al., Chapter 5—An Integrated SystemC Debugging Environment, Embedded Systems Specification and Design Languages, 2008, pp. 59-71, [retrieved on Mar. 25, 2016], Retrieved from the Internet: <URL:http://ieeexplore.ieee.org/>.*

Screen shots from video presentation "Inventing on Principle" by Bret Victor, 2012, http://2012.cusec.net/first-video-posted-bret-victor/.

* cited by examiner

Endmodule

310 —— // BENCHMARK INFO : EP4S100G5F45C2
       // BENCHMARK INFO : Max depth : 4.2 LUTs
320 —— // BENCHMARK INFO : Combinational ALUTs : 397
       // BENCHMARK INFO : Memory ALUTs : 80
330 —— // BENCHMARK INFO : Dedicated logic registers : 431
       // BENCHMARK INFO : Total block memory bits : 0
340 ⎰ // BENCHMARK INFO : Worst setup path @ 468.75MHz : 0.166 ns, From waddr[1], To mlab_32word_32bit:r
     ⎱ // BENCHMARK INFO : Worst setup path @ 468.75MHz : 0.226 ns, From view_waddr[2], To mlab_32word_32
       // BENCHMARK INFO : Worst setup path @ 468.75MHz : 0.225 ns, From waddr[1], To mlab_32word_32bit:r
       205/257      col 1  1/1  stat_ram_16x64b.v

PREEMPTIVELY GENERATING STATISTICAL FEEDBACK ON A DESIGN FILE AND PRESENTING THE FEEDBACK IN AN INPUT CONTEXT

FIELD OF THE INVENTION

The present disclosure relates generally to programming, and, more particularly, to techniques and mechanisms for improving software tools for assisting programmers design components and systems.

BACKGROUND

With the increasing complexity of modern technology, software tools have become an important resource for designers of electronics (and software) components and systems. In particular, software tools for obtaining projections of performance statistics, or other statistical information, regarding a pending design can be very useful.

For example, computer aided design (CAD) software tools have been developed which can provide designers of integrated circuits with projections of how circuits they are designing are likely to perform. Such tools may provide useful statistical estimates, for example, of critical timing paths, resource usage, power consumption, and other issues important for assessing the effectiveness of a pending design of an electronics system or product. Similarly, in the software context, tools have been developed for evaluating various parameters of interest in a software program. For example, in the software context, performance estimates of interest might include, the amount of memory, or processor resources, a software program is likely to require.

Frequently, such statistical feedback information will be generated as part of a process in which a program file is compiled.

Such information can be critical in helping designers to identify which aspects of their design are likely to be successful, and which are likely to be problem areas. Given the complexity of modern devices and systems, such information is often difficult or impossible for a designer to anticipate or estimate by themselves without the aid of such software tools.

While presently existing systems for providing such feedback to programmers exist, they do not fully realize the benefits such feedback mechanisms could provide. Various embodiments of the present disclosure seek to improve upon and provide more sophisticated techniques for implementing such statistical feedback software tools.

BRIEF DESCRIPTION OF THE DRAWINGS

Techniques and mechanisms are provided for improving software tools that provide statistical feedback to designers concerning performance features of their designs.

The above techniques and mechanisms, together with other features, embodiments, and advantages of the present disclosure, may best be understood by reference to the following description taken in conjunction with the accompanying drawings, which illustrate various embodiments of the present techniques and mechanisms. In the drawings, structural elements having the same or similar functions are denoted by like reference numerals.

DESCRIPTION OF PARTICULAR EMBODIMENTS

Overview

Techniques and mechanisms for improving software tools that provide programmers with statistical feedback regarding performance features of their pending designs are described. Such techniques and mechanisms may result in faster and more effective presentation of feedback information to programmers.

According to an embodiment of the present disclosure, a computer readable storage medium having computer program instructions stored thereon that are configured to preemptively or anticipatorily launch a process that generates statistical feedback regarding the performance features of a pending design is provided. In some embodiments, the computer readable storage medium may be configured such that a compile process (or other process that provides desired feedback) may be automatically launched at predetermined intervals. In some embodiments, the computer readable storage medium process may be configured such that the compile process is launched in response to one or more specified events, such as, for example, the programmer saving a copy of the program file, or the programmer checking in a copy of the program file into a versions repository. Additionally, in some embodiments, the computer readable storage medium may be configured such that it also provides a graphical user interface (GUI) which allows the user to select the circumstances for generating feedback information.

According to an embodiment of the present disclosure, automated techniques for launching a compile process (or other process by which feedback statistics are generated) are combined with improved techniques for providing the resulting statistical feedback information to the programmer/designer. For example, according to an embodiment of the present disclosure, the computer readable storage medium is configured such that statistical feedback may be provided to the programmer in a same working environment (in one example, in a same integrated development environment (IDE)) in which the programmer is editing or working on a program file. Further, in some embodiments, such feedback information may be provided while the underlying program file is still open.

Further, various embodiments of the present disclosure provide improved mechanisms for displaying the feedback information in a graphical user interface (GUI) so that the programmer/designer is able to more easily access the information and more easily identify critical portions of the feedback information. According to an embodiment of the present application, for example, the computer readable storage medium is configured such that feedback information may be provided in a separate window from that in which a programmer/designer is editing the text of the program file. Further, in some embodiments, text of the statistical feedback (presented, for example, in a feedback window) may be linked to corresponding relevant portions of the program file such that when a programmer/designer selects particular text of the statistical feedback (in the feedback window, for example) the editing window may automatically change, if needed, to display the portion of the program file which is relevant to the selected feedback text.

The foregoing, together with other features, embodiments, and advantages of the present disclosure, will become more apparent when referring to the following specification, claims, and accompanying drawings.

Example Embodiments

As technology has evolved and become more complex, the design of electronic systems and components (and software itself) has become increasingly reliant on software tools. For example, integrated circuits, which are used in virtually all electronic equipment today, are typically designed using computer aided design (CAD) tools (also sometimes called electronic design automation (EDA) tools).

The same is true for printing circuit boards (PCBs), field programmable gate arrays (FPGAs) and other programmable logic devices (PLDs), as well as many other electronics components and systems. Quartus II, a CAD software tool, for example is a software design tool developed by Altera Corporation for designing logic devices.

Figure 1:
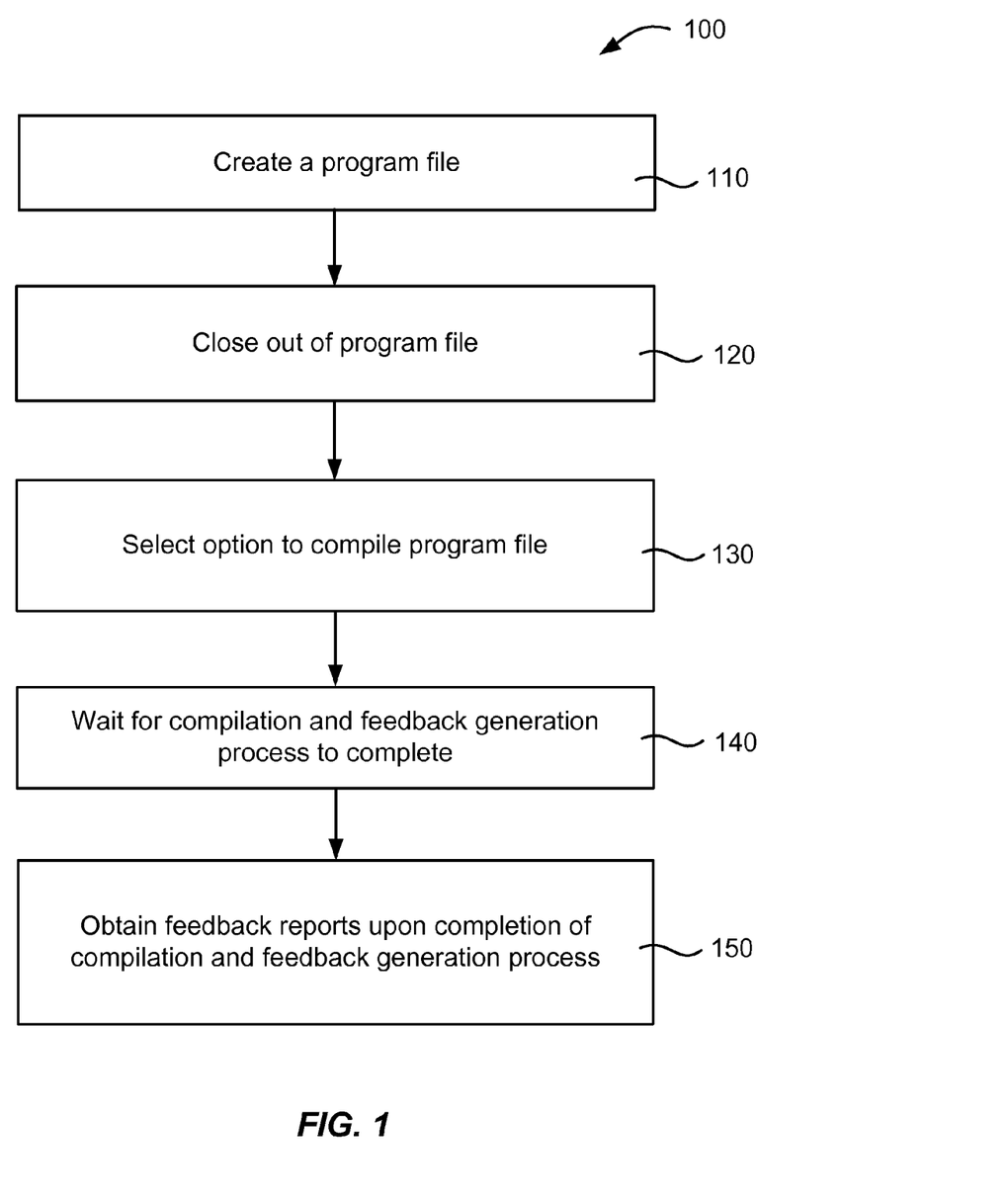
FIG. 1 is a simplified high-level flowchart depicting different features of a conventional process for generating performance statistics for a program file.

FIG. 1 is a simplified high-level flowchart depicting different features of one conventional process for generating performance statistics regarding a pending design file. While the actual design details may differ, the processes for designing different electronics components and systems often share similarities at a high level. For example, they may involve placement, routing and timing analysis, among other things.

"Placement" may involve determining the specific locations of all the needed electronic components, circuitry, and logic elements on a chip. This may be followed by "routing", which may determine the exact location of all the wires needed to connect the placed components. This routing step usually must insure that all the desired connections are made while also complying with the rules and limitations of the relevant manufacturing process that will be used in creating the device or system. As the completion of the placing and routing steps, a layout, that is, a geometric description of the location of each component, and an exact path of the wires connecting them, may be generated. Timing analysis may then be performed on this layout to estimate how long it will take signals to traverse different paths on the placed and routed layout.

The steps involved in designing an electronic component or system, as shown in FIG. 1, may involve at a step 110 a programmer creating a program file that describes features desired in the product/system, among other things. The programmer/designer may use a hardware description language (HDL), such as Verilog or VHDL, to create the program file.

As shown in FIG. 1, at step 140, CAD software tools may be run on the program file as it is being compiled. The software tools may enable the developer to synthesize or compile their designs, perform timing analysis, examine RTL diagrams, run simulations, and/or configure the target device, among other things.

Such feedback generating software tools may be run in the same working environment that the programmer is editing the program file, or, in alternative embodiments, the software tools may run in a different working environment, or on a different computing system. The performance statistics tools may perform tasks such as placement at 140a, routing at 140b, and timing analysis at 140c, among other things.

Finally, at 150, the compilation process may complete. A set of feedback reports may be provided to the programmer/designer at this time; or alternatively feedback reports may be provided over the course of the compilation and analysis process as different sets of statistics become available. Additionally, at the completion of the compilation and analysis process, a software design file may be output, which is capable of being used to configure a target device or system in question.

Typically, in conventional processes, statistical feedback generating software tools are run after a program file has been closed, for example, as shown in FIG. 1, at step 120. The tools usually operate as part of a compile process, and a compile process is usually run when a programmer has closed out of a program file. For example, frequently, a compile process (or other process for obtaining statistical feedback) is run at the end of the day after a programmer has finished working on a program file.

After the programmer has closed the program file at step 120, the programmer at step 130 then generally has to select an option to compile the file. Then during step 140, the programmer then may have to wait for the compile and feedback generation process to complete. The compile and feedback generation (e.g., analysis) process as a whole can take several minutes to many hours to complete, depending on the complexity of the design.

At a step 150, the feedback that is generated is then provided to the programmer. Conventionally feedback is presented to the programmer in several separate reports, each report pertaining to a set of statistics obtained at a particular phase in the compilation and feedback generation process.

These reports can be lengthy and detailed, and it can be challenging and time consuming for a programmer to locate the statistics of most importance, and then to cross reference that feedback to the corresponding relevant portions of the program file in order to determine where edits need to be made.

As circuits become increasingly complex, and timing analysis, and resource and power usage, become increasingly key to the design of components and systems, statistical information projecting how a design to likely to perform once implemented has become more and more important. Early and frequent feedback concerning the circuit level implications of design choices can therefore provide important benefits.

Various embodiments of the present disclosure seek to provide techniques and mechanisms for generating more frequent and effective statistical feedback regarding performance features of a product or system. Various embodiments provide timely statistical feedback regarding performance features of a current design in a manner that provides less interruption of a programmer's work, easier access to the statistics from a programmer's working environment, and mechanisms for facilitating faster identification of potential problem areas in a design, among other things.

The embodiments of the present invention described below are discussed in terms of techniques relating to statistical feedback in the context of designing hardware components such as programmable logic devices (PLDs). It should however be understood that, in addition to such design processes, the teachings of the present application may also be implemented in connection with the design of integrated circuits, PCBs, other electronic components or systems, as well as software components or systems. It is not necessary that the systems or products being designed be PLDs in the manner described in various embodiments. Further, it will be understood that the below described solutions for providing statistical feedback in a more timely and effective manner could be implemented separately, or in combination with each other, as appropriate. The embodiments of the present invention described below are not meant to limit the scope of the present invention.

As noted, improvements for generating more frequent and effective statistical feedback regarding performance features of a product or system are achieved in part by preemptively launching software tools for analyzing program design files while the files are still open. Further improvements are achieved by techniques for providing statistical feedback information to a programmer in a more effective manner.

Figure 2:
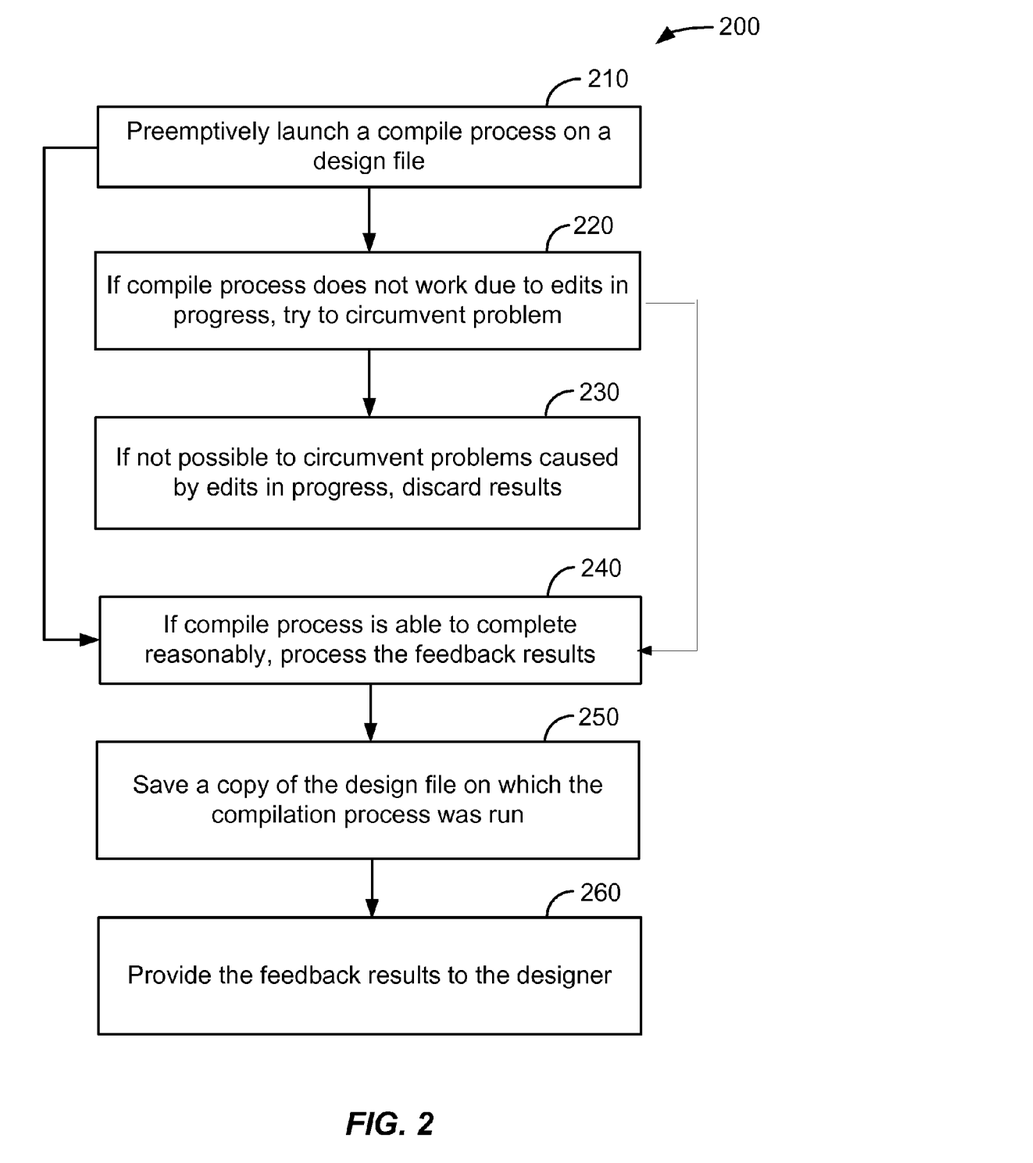
FIG. 2 is a simplified high-level flowchart depicting different features of an example method according to an embodiment of the present disclosure.

FIG. 2 is a simplified high-level flowchart depicting different features of an example method according to an embodiment of the present disclosure.

Typically, a computer on which a programmer is creating an HDL file for designing an integrated circuit, for example, has the appropriate CAD tools to synthesize/place and route/ timing analyze the circuit, for example, and those tools and additional processing resources are sitting idle as the engineer thinks and types One reason why a compile/generation of feedback process typically is only run after a program file has been closed is due to the perception that edits in process can complicate the process of compiling and analyzing a current design. However, the inventors have found that most intermediate stages of a circuit design, although not representing the final intent, do substantially reflect the properties of a circuit under design, and it is possible to devise solutions for getting around some of the more apparent problems that can occur due to incomplete edits appearing in a program file at the time it is compiled and feedback statistics are generated.

In a step 210, according to an embodiment of the present disclosure, an enhanced editor environment in which a programmer is working speculatively launches a CAD tool on a circuit under construction. The CAD tool is launched automatically and preemptively while a programmer is still editing the program file, and the performance statistics generated by the compile process are displayed in a working environment in which the programmer is editing the file.

In some embodiments, the launch of the CAD tool may occur periodically at predetermined set intervals. In some embodiments, the duration of the intervals may be set by the programmer.

In other embodiments, the launch of the CAD tool may occur in response to predefined user actions, for example, when the user saves the program file or elects to check a program file into a versions library. The user may also be provided with options in a graphical user interface (GUI) for defining predefined actions for triggering such a compile process, and/or a time frame during which such actions will trigger a feedback generation and compile process.

The feedback information may include performance statistics concerning, for example, resource utilization (for example use of look up tables (LUTs), flip flops, random access memory (RAM), or routing wires); identification of critical paths and estimation of the time it takes a signal to traverse a critical path; and/or other performance features of a circuit design. The user may also be provided with options prior to the time that the compile/feedback generation process is launched to determine the statistics to include in the feedback, and/or the algorithms to be applied in analyzing the program file.

Providing a mechanism for more frequent and up to date feedback enables a programmer to get a better understanding of edits in progress, and quickly rectify any wrong turns. That is, providing timely feedback not only reduces the amount of time the programmer must wait to see relevant feedback information, it can also reduce time spent on pursuing design ideas which are ultimately unproductive.

In 220, if the compile process does not work due to edits in progress, it is determined whether it is possible to circumvent the disruptions caused by the edits in progress. For example, some CAD tools have features for responding to errors in a program file. For example, if in a design, a circuit component remains unconnected to the rest of the circuit, a CAD tool may enact a minimization that eliminates that circuit component from the design. Allowing such a feature to operate in the context of various embodiments of the present disclosure may lead to less useful feedback results. This is because due to edits in process a particular component may be disconnected from the rest of the circuit, but may be intended to be connected to the circuit eventually. Accordingly, under some embodiments of the present disclosure, the programmer may have the option of shutting down these minimizations processes that would normally operate. Such an option may make the compilation and feedback generation process more forgiving to incomplete circuits (for example, by preventing the entire circuit from minimizing away before it is finished). For example, in one embodiment, if the circuit disappears due to the normal operation of such minimization processes, the process could automatically shift to a mode where minimizations are disabled.

In 230, if it is not possible to correct for incomplete aspects of the circuit caused by edits in progress, and reasonable feedback cannot be generated, a process may be provided whereby the results are discarded. In some embodiments, the failure of the process to complete may be reported to the programmer if desired.

In 240, if the compile process is able to complete reasonably given the snapshot of the program file upon which the compile process is run, then according to various embodiments of the present disclosure, the generated statistical feedback information may be processed into a form that is useful to a programmer/designer.

In 250, according to an embodiment of the present disclosure, a copy of the snapshot of the program file on which a successful compilation process is run may be saved in a versions library. The feedback results obtained from the feedback generation process may also be saved and it may be associated in some manner with the corresponding program file. Providing a mechanism for saving particular snapshots of program files each time the compilation process is run, may enable a programmer to retrace his or her steps to identify which solutions were most effective in reaching desired results, among other things.

In 260, the feedback information may be provided to the programmer. In one embodiment, the feedback information may be displayed in an input context in which the programmer is editing the program file. Below various embodiments that provide improved modes of communicating the feedback information to the programmer/designer are provided.

Displaying software feedback in the input context (for example, in the development environment or editor in which the circuit designer is creating or optimizing a design file) lets a circuit designer more quickly, and with less interruption to his or her thought processes, see potential problems as well as advantages of different solutions he/she is considering including in a circuit design.

As described above, according to an embodiment of the present disclosure, mechanisms are provided for automatically and continuously running software in the background to compiled and analyze input design files created by a designer and additionally showing the feedback results to the designer as he/she is working, in the environment of the file(s) he/she is editing. Further, as noted above, according to embodiments of the present disclosure, the software feedback can be displayed in a manner that allows for quicker and more efficient identification of important issues. Several such embodiments for providing the feedback to a programmer will be discussed next.

According to one embodiment of the present disclosure, textual feedback information and/or statistics may be added as comments within a copy of the program file being edit. The copy of the program file may be one based on which the feedback was generated. This embodiment has the benefit of creating a record for later easy reference.

Figure 3:
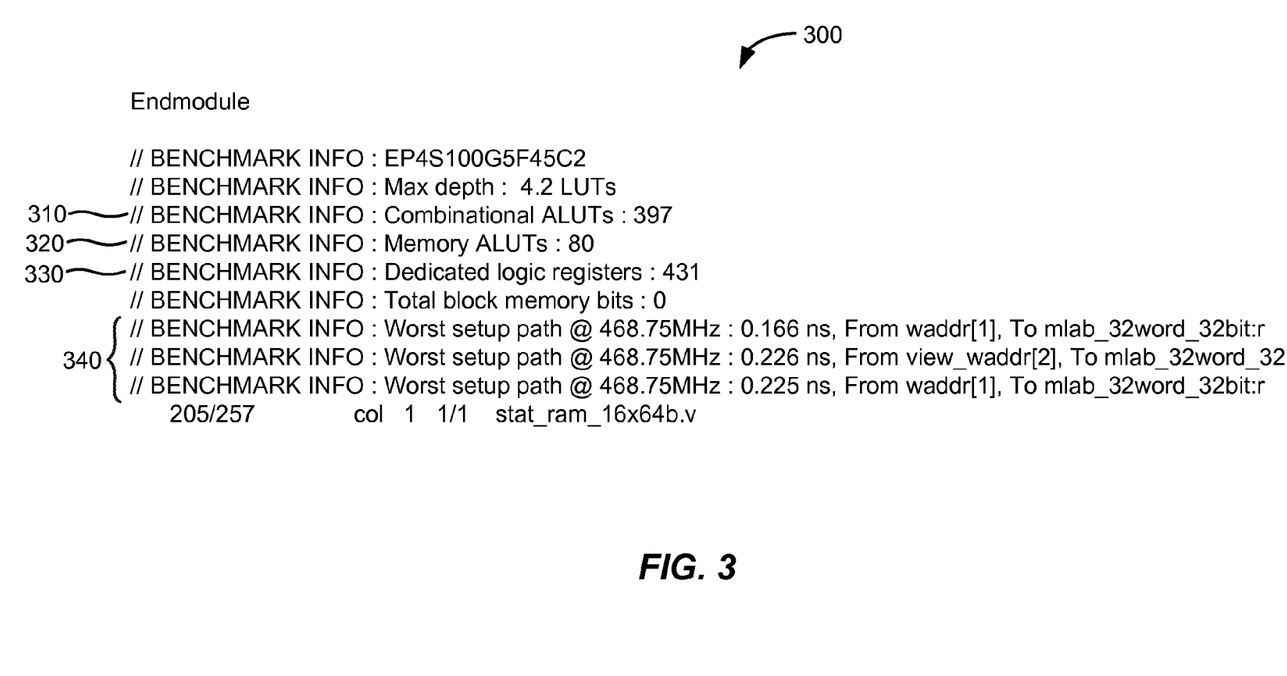
FIG. 3 is a simplified block diagram of an example comments section added to a program file according to an embodiment of the present disclosure.

FIG. 3 is a simplified block diagram of an example comments section 300 added to a program file according to this embodiment of the present disclosure.

This example shows statistics pertaining to logic 310, registers 320, memory use 330 and several critical timing paths 340, for example. Among other things, this information could inform the designer, for example:

If a recent edit unexpectedly increased resource usage significantly

Which area(s) are the most urgent timing bottlenecks

If higher level speed/resource requirements are currently being satisfied

The programmer may be given an option at the time a program file with the added statistical comments is generated, to either continue his edits on the copy of the program file he is already editing, or to replace in the editing window that version, with the newly generated version with the statistical comments.

Figure 4:
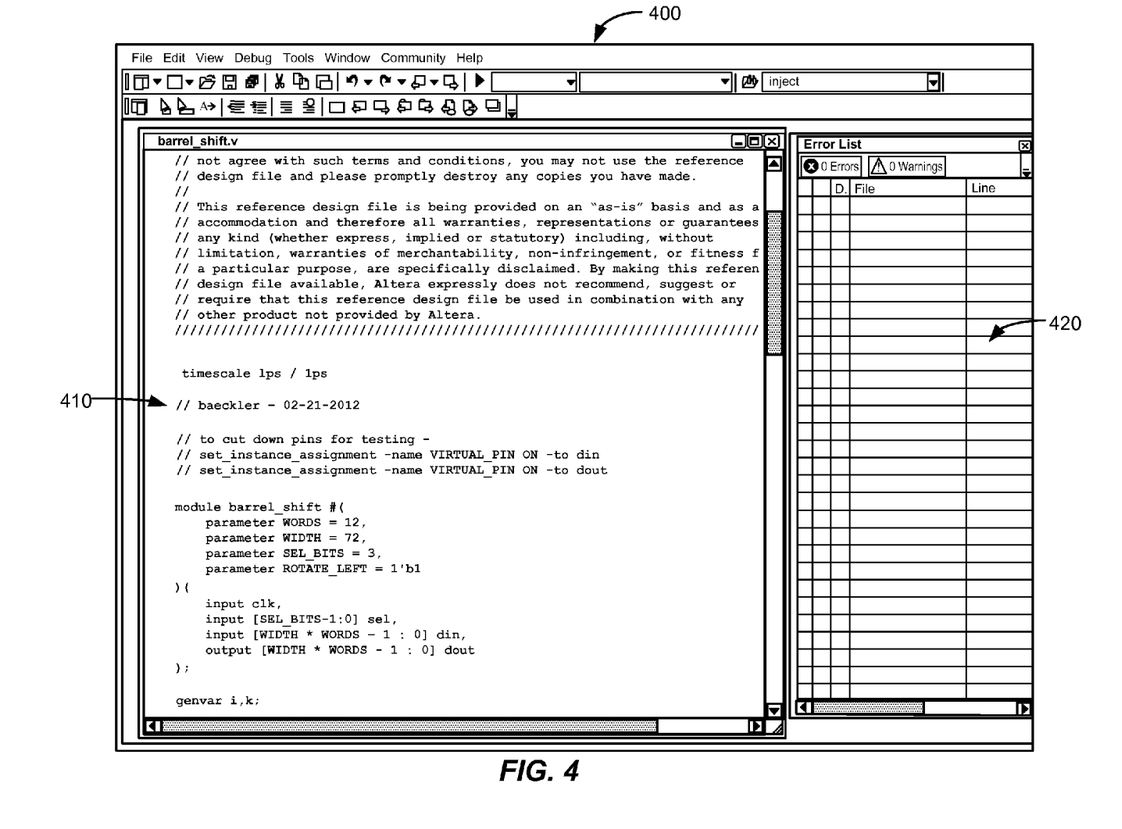
FIG. 4 is a simplified block diagram of an example feedback window for providing statistical feedback information to a programmer according to an embodiment of the present disclosure.

According to another embodiment of the present disclosure, a separate feedback window may be provided in a same working environment 400 in which a programmer is developing the design. FIG. 4 is a simplified block diagram of a working environment 400 having an editing window 410 and a feedback window 420, the feedback window 420 providing statistical feedback information to a programmer according to an embodiment of the present disclosure;

Feedback may be displayed in real time on the window 420, and may be updated each time another iteration of the compile and feedback generation process is run. The feedback may include statistical feedback regarding performance features of the software or hardware at issue.

According to an embodiment of the present disclosure, the contents of the two windows 410 and 420 may be linked, such that if a message appears on the right window 420, clicking on it will allow the user to locate the relevant source code in the left window 410. For example, if a message that "previous compile result 2000 ALUTs, failing timing by 200 ps" appears in the right window 420, according to some embodiments, if a programmer clicks on that message, the contents of the editing window 410 may change so that it displays the relevant portion of the source code.

Additionally, according to a particular embodiment of the present disclosure, a user may select a line of source code in the left window 410, and if there is any feedback that relates to that line of source code, it may be displayed in the feedback window 420 on the right.

Figure 5:
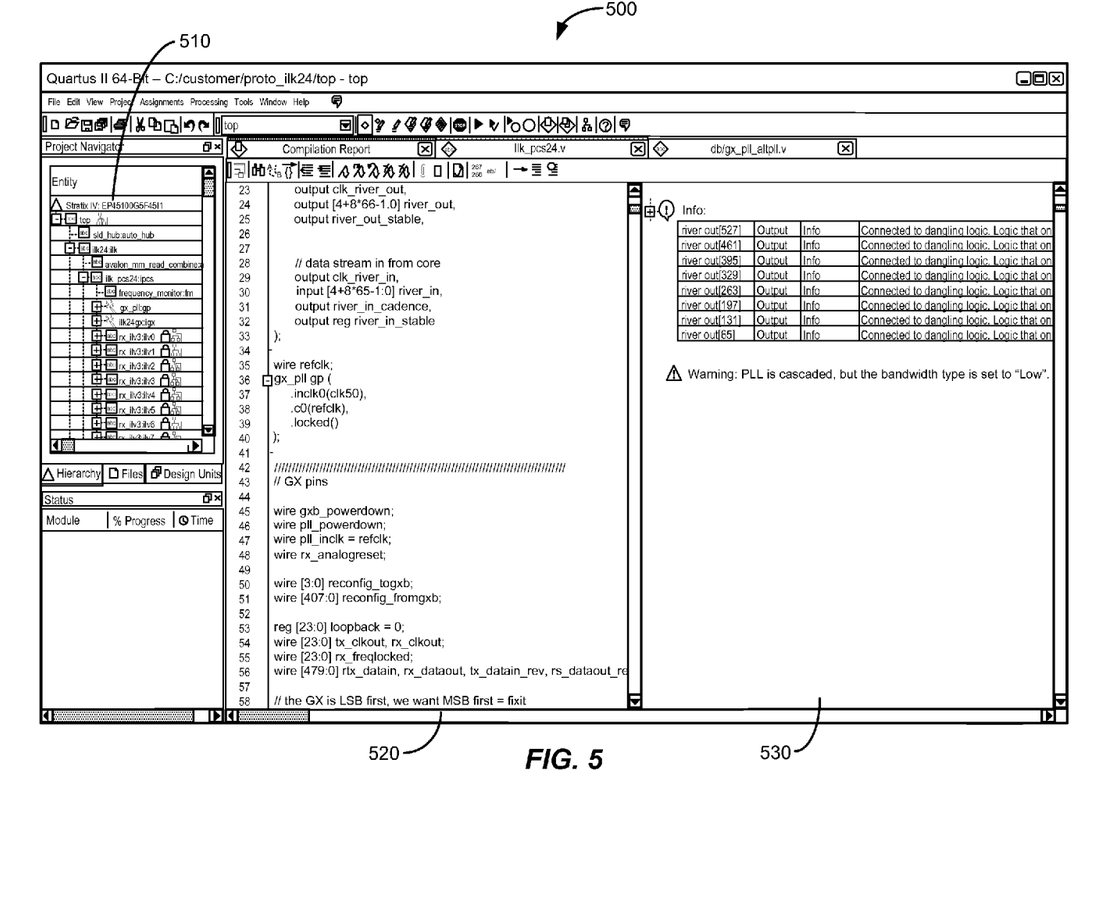
FIG. 5 is a simplified block diagram of a slaved scrolling window for providing statistical feedback information to a programmer according to an embodiment of the present disclosure.

According to another embodiment of the present disclosure, the feedback window could be implemented as a slaved scrolling window to show feedback information aligned with source code. FIG. 5 is a simplified block diagram of working environment 500 with a slaved scrolling window 530 according to an embodiment of the present disclosure.

As shown in FIG. 5, a hierarchical index 510 can be provided in a working environment 500 for allowing a programmer to more easily jump around the program file, and quickly scroll to different portions of the source code. A benefit of the hierarchy can be that levels of detail for various components of the hierarchy can be exposed or hidden depending on the programmer's preference. That is, progressively more detail could be revealed as, for example, each plus sign in the hierarchy shown in the hierarchical index 510 or FIG. 5.

According to another embodiment of the present disclosure, a temperature map may be implemented in a working environment to allow areas of a design file likely to cause problems to be highlighted. On a successful compile, typical CAD tools for synthesis and analysis of HDL designs (such as, for example, Altera's Quartus software) have a great deal of information regarding which lines of the source file are associated with which cells of the circuit and which lines of the source file are associated with which timing arcs. According to some embodiments, based on this information, the text or background in the editor window may be colored with a good approximate temperature map to indicate areas of the program file that are most critical in terms of reducing resource usage or improving timing, for example. Such a feature could assist in focusing the designer on promising areas for optimization.

According to an embodiment of the present disclosure, in addition to providing feedback generation in the context of tools for synthesizing or compiling design files, performing timing analysis, examining RTL diagrams, and/or configuring the target device, techniques of the present disclosure may also be applied to generate feedback in the context of running test benches which simulate the behavior of a design in response to various stimuli. For example, some simulation test benches produce a machine understandable "PASS/FAIL" at the end of running a simulation on a program file. According to one embodiment, the system could run the test bench speculatively and alert the designer to a situation where he or she had, for example, functionally broken the logic, but not yet realized it.

The above described techniques for assisting a programmer can be applied to programs for designing a diverse range of hardware and software products. Various embodiments may involve application of the techniques and mechanisms of the present disclosure to tools for designing programmable logic devices (PLDs), Application Specific Integrated Circuits (ASICs), Application Specific Standard Products (ASSPs), or other types of hardware devices. Additionally, as noted above, the techniques may be used to assist a programmer to improve the effectiveness of software products.

For example, in addition to the tools described above, profilers, memory leak analyzers, test coverage tools, regression tests, bug trackers, could all also be preemptively launched, and the feedback that they generate could be annotated/visualized in the working environment in which a programmer is editing a program file in the manner described in connection with the above described embodiments of the present application.

As noted above, various embodiments of the present disclosure may be used to design electronics components, including, for example, a programmable logic device (PLD).

Figure 6:
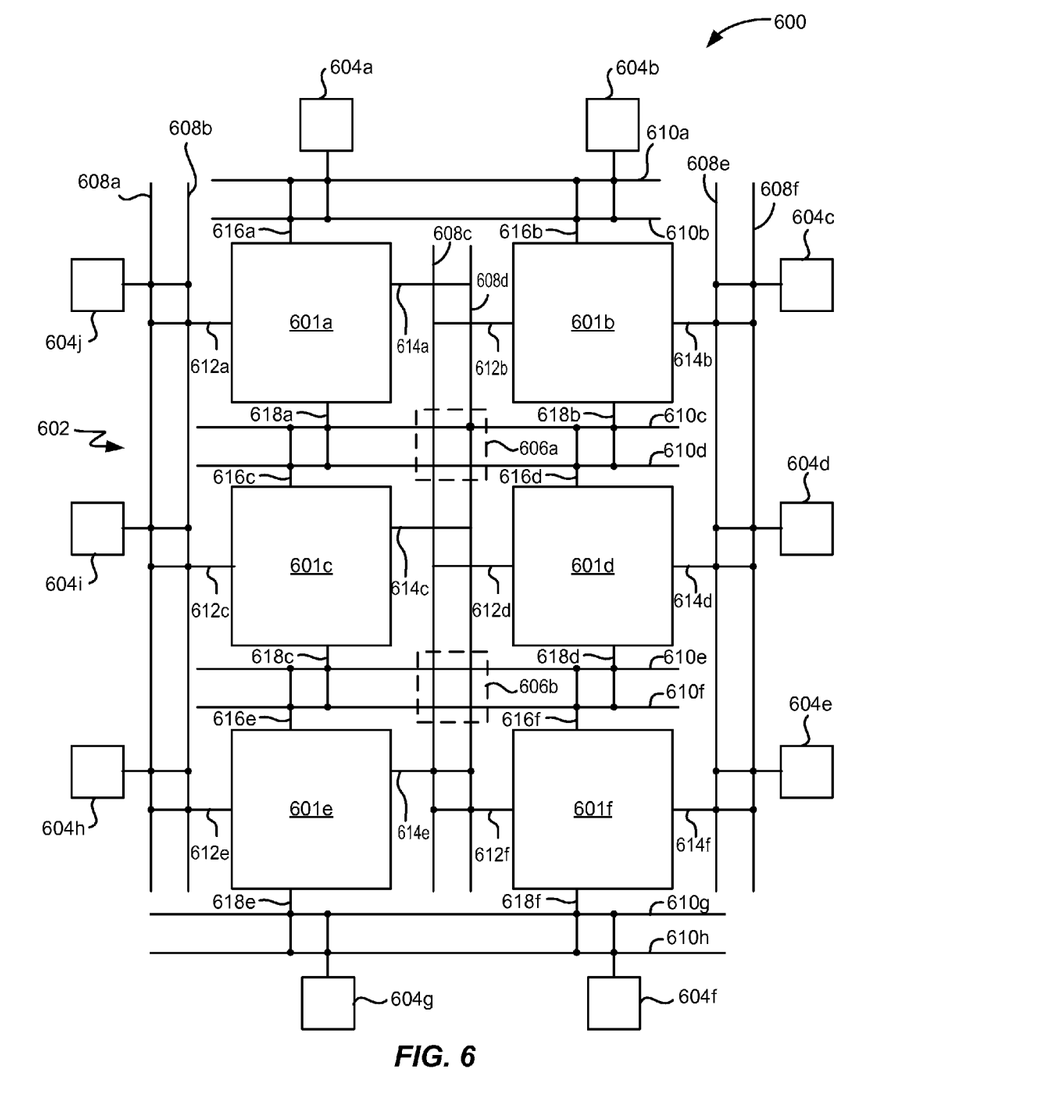
FIG. 6 is a simplified block diagram of an example device which may be designed using techniques according to an embodiment of the present disclosure.

FIG. 6 illustrates a PLD which may be designed using techniques and mechanisms described in the present disclosure.

A PLD may comprise a plurality of logic array blocks containing logic elements (LEs), look up tables (LUTs), and other elements, which a user may use as building blocks to implement desired features. For example, referring to FIG. 6, a programmable logic device (PLD) 600 may be a field programmable gate array (FPGA). In various embodiments, PLD 600 may include multiple logic array blocks 601 (LABs), a routing architecture 102, multiple input/output (IO) pads 104, and switches 606. It is appreciated that one or more of the LABs 601 and switches 106 may be configured using configuration data. LABs 601 may be coupled to each other via the routing architecture 602 and/or one or more switches 606. The routing architecture 602 may include multiple vertical LAB lines 608 and multiple horizontal LAB lines 610. LABs 601 may have one or more LAB inputs 612 and one or more LAB outputs 614. LABs 601 may also have, in the vertical direction, one or more LAB inputs 116 and one or more LAB outputs 618. It is noted the signals may also go in the opposite direction with the items designated 612 and 616 representing LAB outputs, and the items designated 614 and 618 representing LAB inputs. IO pads 604 may be coupled to the routing architecture 602.

In one embodiment, LAB 601a may receive an input signal from IO pad 604j through the LAB input 612a. In some embodiments, the LAB 601b may receive an input signal from another LAB, e.g., LAB 601a via LAB input 612b. It is appreciated that LAB 601b may output the received signal via LAB output 614b to the IO pad 604c. The IO pad 604c may send the output signal to an off-chip device (not shown). In certain embodiments, the off-chip device may be located on a chip separate from a chip on which PLD 600 may be located.

Although six LABs 601 are shown in FIG. 6, it is noted that in various embodiments, PLD 600 may include a different number of LABs 601. Moreover, although ten IO pads 604 are shown in FIG. 6, in some embodiments, a different number of IO pads 604 may be used.

Any of LABs 601 may include one or more logic elements (LEs). The logic elements may include n-input look-up tables, flip-flops, such as a D flip-flop or a JK flip-flops, one or more multiplexers, among other things.

Some PLDs provide some blocks of one or more LABs 601 which are configured to perform certain functions which a user may find useful. For example, a PLD might be configured such that a group of LUTs, flip flops and other elements of a PLD are designed to implement an IO interface, a transceiver, a memory controller, or some other desired functionality. In some embodiments, such a functional block may use one or more LABs that span multiple rows and/or multiple columns within a PLD.

While the disclosure has been particularly shown and described with reference to specific embodiments thereof, it will be understood by those skilled in the art that changes in the form and details of the disclosed embodiments may be made without departing from the spirit or scope of the disclosure. For example, embodiments of the present disclosure may be employed with a variety of network protocols and architectures. It is therefore intended that the disclosure be interpreted to include all variations and equivalents that fall within the true spirit and scope of the present disclosure.

What is claimed is:

1. At least one non-transitory computer readable storage medium having computer program instructions stored thereon that are arranged to perform the following operations:

preemptively launch a compile process on a copy of a program file while the program file is still open, wherein the program file includes textual content relating to a design of a circuit of a hardware component or system;

in connection with the compile process, generate feedback information relating to one or more performance features of the circuit of the hardware component or system, the feedback information including an indication that a change in the textual content of the program file corresponds to a critical path associated with an interconnect of the circuit transitioning from meeting a threshold delay before the change to exceeding the threshold delay after the change;

determine that the textual content of the program file includes a first portion and a second portion, the first portion contributing more to the critical path exceeding the threshold delay than the second portion of the textual content of the program file; and provide the feedback information to a user, the providing including emphasizing the first and second portions of the textual content of the program file corresponding with the critical path exceeding the threshold delay after the change, the first portion being emphasized differently than the second portion to indicate contributing more to the critical path exceeding the threshold delay.

2. The non-transitory computer readable storage medium of claim 1, wherein the user is a programmer creating or editing the program file; and wherein the feedback information is provided to the programmer in a working environment in which the programmer is working on the program file.

3. The non-transitory computer readable storage medium of claim 2, wherein the feedback information is provided to the programmer in comments embedded in a copy of the program file.

4. The non-transitory computer readable storage medium of claim 2, wherein the feedback information is provided to the programmer in a first window of the working environment in which the programmer is editing the program file, and wherein the programmer is editing the program file in a second window.

5. The non-transitory computer readable storage medium of claim 4, wherein the feedback information provided to the programmer in the first window is linked to the program file being edited by the programmer in the second window, and
wherein selection by the programmer of a portion of the feedback information in the first window causes the second window to display a portion of the program file that relates to the feedback information selected by the programmer in the first window.

6. The non-transitory computer readable storage medium of claim 2, further comprising:

saving the copy of the program file compiled in connection with generating the feedback information; and
saving a copy of the feedback information; and
associating the saved copy of the feedback information with the saved copy of the program file.

7. The non-transitory computer readable storage medium of claim 1, wherein the hardware component or system is an integrated circuit, a programmable logic device, or a printed circuit board.

8. The non-transitory computer readable storage medium of claim 1, wherein the feedback information includes performance statistics relating to timing analysis, resource usage, and/or power consumption of the hardware component or system.

9. The non-transitory computer readable storage medium of claim 1, wherein the compile process is automatically and periodically launched at intervals of a predetermined duration.

10. The non-transitory computer readable storage medium of claim 1, wherein the compile process is launched in response to an action by a programmer of the program file, the launching action occurring in a working environment in which the programmer is editing the program file.

11. The non-transitory computer readable storage medium of claim 10, wherein the launching action comprises the programmer saving a copy of the program file or checking in a copy of the program file into a versions repository.

12. The non-transitory computer readable storage medium of claim 1, wherein a graphical user interface (GUI) is provided which gives the user an ability to determine circumstances which will trigger a preemptive launch of the compile process.

13. The non-transitory computer readable storage medium of claim 1, the computer program instructions stored thereon are arranged to further perform the following operations:
   in connection with the compile process, identify an incomplete portion of the program file representing a circuit unconnected from other circuitry represented in the program file, wherein the feedback information provided to the user excludes information regarding the incomplete portion.

14. A non-transitory computer readable storage medium having computer program instructions stored thereon that are arranged to perform the following operations:
   preemptively launch a compile process on a copy of a program file while the program file is still open, wherein the program file includes textual content relating to a design of a software component or system;
   in connection with the compile process, generate feedback information relating to one or more performance features of the software component or system, the feedback information including an indication that a change in the textual content of the program file corresponds to a critical path associated with an interconnect transitioning from meeting a threshold delay before the change to exceeding the threshold delay after the change;
   determine that the textual content of the program file includes a first portion and a second portion, the first portion contributing more to the critical path exceeding the threshold delay than the second portion of the textual content of the program file; and
   provide the feedback information to a user, the providing including emphasizing the first and second portions of the textual content of the program file corresponding with the critical path exceeding the threshold delay after the change, the first portion being emphasized differently than the second portion to indicate contributing more to the critical path exceeding the threshold delay.

15. The non-transitory computer readable storage medium of claim 14, wherein the user is a programmer creating or editing the program file; and wherein the feedback information is provided to the programmer in a working environment in which the programmer is working on the program file.

16. The non-transitory computer readable storage medium of claim 15, wherein the feedback information is provided to the programmer in comments embedded in a copy of the program file.

17. The non-transitory computer readable storage medium of claim 15, wherein the feedback information is provided to the programmer in a first window of the working environment in which the programmer is editing the program file, and wherein the programmer is editing the program file in a second window.

18. The non-transitory computer readable storage medium of claim 14, wherein the feedback information includes performance statistics relating to memory usage and/or processor resource usage.

19. The non-transitory computer readable storage medium of claim 14, wherein the compile process is automatically and periodically launched at intervals of a predetermined duration.

20. The non-transitory computer readable storage medium of claim 14, wherein the compile process is launched in response to an action by a programmer of the program file, the launching action occurring in a working environment in which the programmer is editing the program file.

21. A method, comprising:
   preemptively launching a compile process on a copy of a program file while the program file is still open, wherein the program file includes textual content relating to a design of a hardware component or system;
   in connection with the compile process, generating, by a processor, feedback information relating to one or more performance features of the hardware component or system, the feedback information including an indication that a change in the textual content of the program file corresponds to a critical path associated with an interconnect transitioning from meeting a threshold delay before the change to exceeding the threshold delay after the change;
   determining that the textual content of the program file includes a first portion and a second portion, the first portion contributing more to the critical path exceeding the threshold delay than the second portion of the textual content of the program file; and
   providing the feedback information to a user, the providing including emphasizing the first and second portions of the textual content of the program file corresponding with the critical path exceeding the threshold delay after the change, the first portion being emphasized differently than the second portion to indicate contributing more to the critical path exceeding the threshold delay.

* * * * *